Jan. 28, 1941. H. M. PFLAGER 2,229,768
RAILWAY TRUCK
Filed June 21, 1937 5 Sheets-Sheet 1
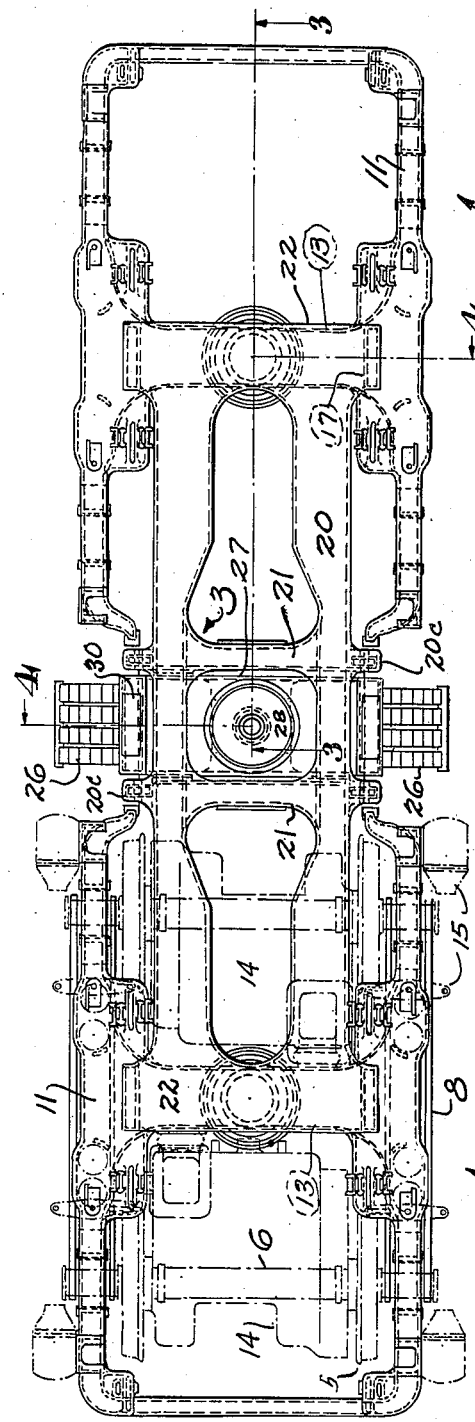
Inventor
Harry M. Pflager
By Rodney Bedell
Attorney

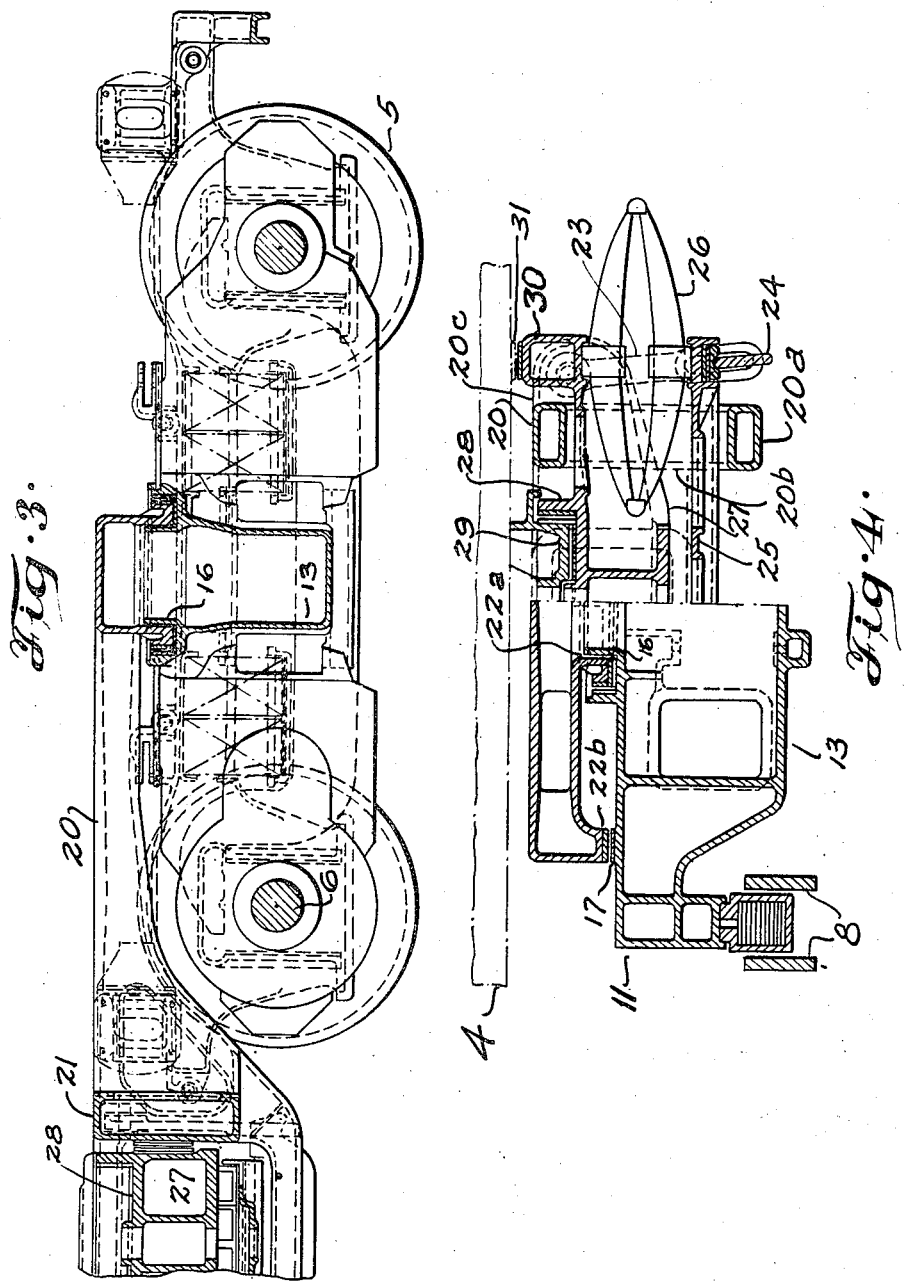

Jan. 28, 1941. H. M. PFLAGER 2,229,768
RAILWAY TRUCK
Filed June 21, 1937 5 Sheets-Sheet 3
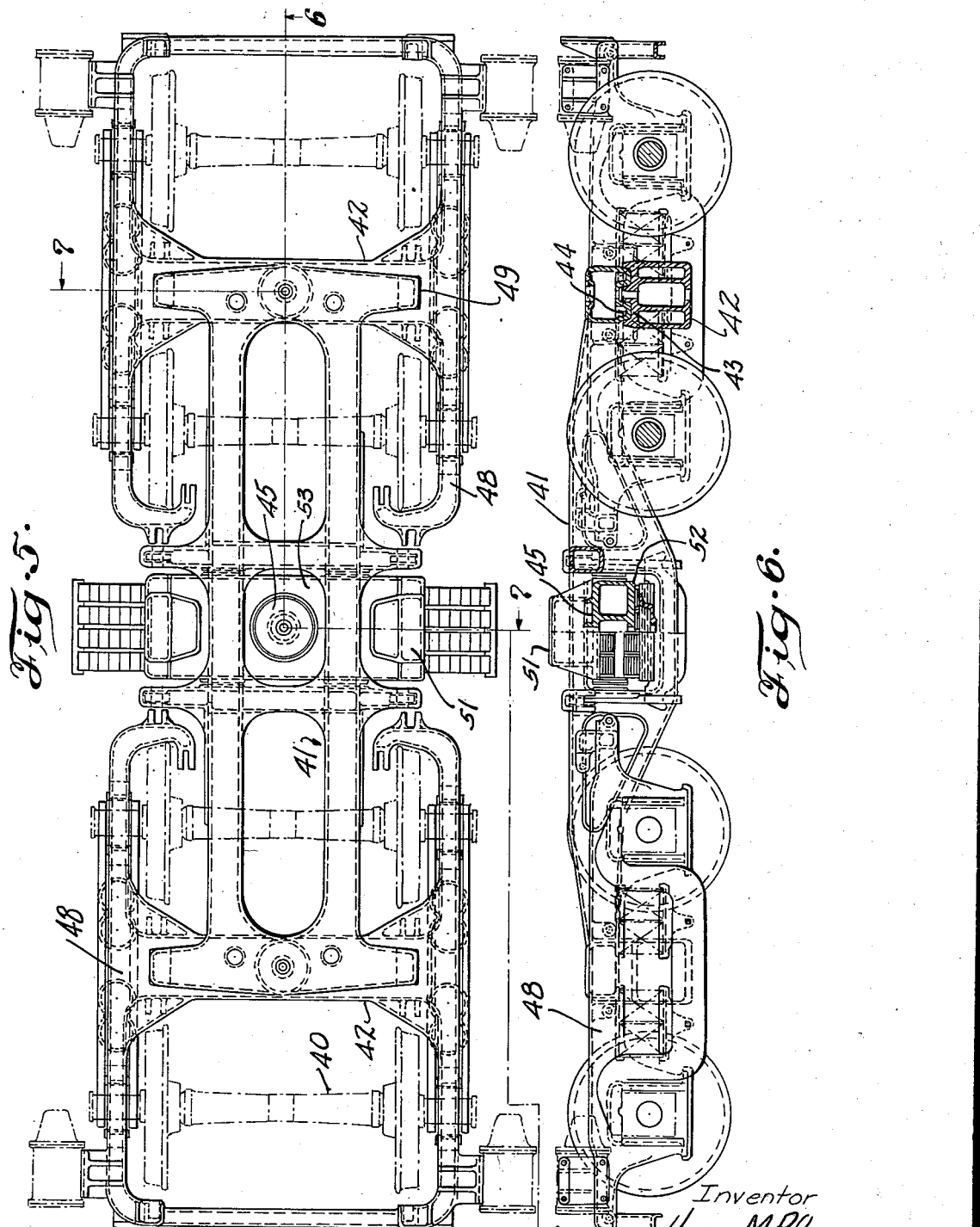
Inventor
Harry M. Pflager
By Rodney Bedell
Attorney Jan. 28, 1941.    H. M. PFLAGER    2,229,768
RAILWAY TRUCK
Filed June 21, 1937    5 Sheets-Sheet 4

Inventor
Harry M. Pflager
By Rodney Bedell
Attorney

Jan. 28, 1941.                H. M. PFLAGER                 2,229,768
                               RAILWAY TRUCK
                            Filed June 21, 1937          5 Sheets-Sheet 5
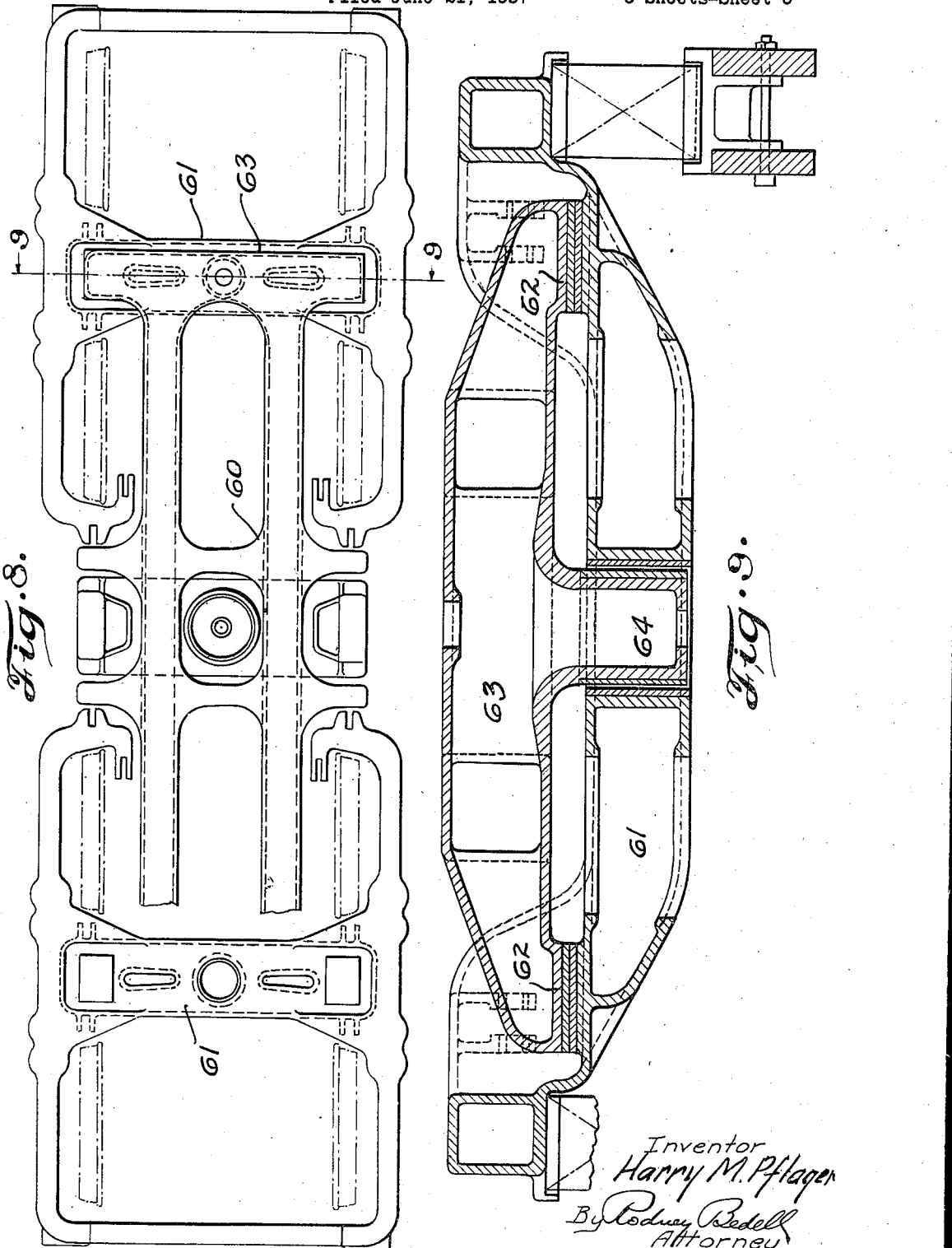
Inventor
Harry M. Pflager
By Rodney Bedell
Attorney Patented Jan. 28, 1941

2,229,768

UNITED STATES PATENT OFFICE 2,229,768

RAILWAY TRUCK

Harry M. Pflager, St. Louis, Mo., assignor to General Steel Castings Corporation, Granite City, Ill., a corporation of Delaware Application June 21, 1937, Serial No. 149,336

8 Claims. (Cl. 105—183)

The invention relates to railway rolling stock and more particularly to trucks for use under heavy vehicles in high speed trains. An example of such vehicles are the heavy Diesel locomotives which are being used in modern passenger trains.

It has been found that because of the high speeds, the load per axle must be maintained at a lower level than might be permissible otherwise, and in order to keep the load per axle down, it is necessary to use more wheels under each end of the vehicle than have been used heretofore. The present invention embodies a compound truck of eight or more wheels, in place of the usual four or six-wheel truck, and the assembly of the truck units and the body-carrying structure.

One object of the invention is to produce a truck with eight or more wheels so arranged that the wheels will properly track and adapt themselves to the curvature of the track with the least possible flange resistance and to provide in such truck a swing motion that will absorb the side thrusts resulting from a vehicle entering a curve or taking switches, thus reducing the flange and rail pressure and causing easy motion of the vehicle body when entering curves.

Another object of the invention is to obtain easy riding qualities.

Another object of the invention is to provide a truck of the type described to maintain a low center of gravity for the vehicle body.

These and other detail objects of the invention are attained by the structures illustrated in the accompanying drawings in which—

Figure 1 is a top view of the truck structure, the axles, wheels, motors, and other parts being omitted from the right hand end of the figure to better illustrate the main components of the truck.

Figure 2 is a side elevation of the structure shown in Figure 1.

Figure 3 is a longitudinal vertical section taken on the line 3—3 of Figure 1 and drawn to an enlarged scale.

Figure 4 is a vertical transverse section taken on the line 4—4 of Figure 1 and drawn to an enlarged scale.

Figure 5 is a top view of a modified form of truck.

Figure 6 is, in part, a side elevation and, in part, a vertical section on the longitudinal center line of the truck.

Figure 8 is a top view of another modified form of truck.

Figure 9 is a vertical transverse section taken on the line 11—11 of Figure 10 and drawn to an enlarged scale.

Figure 7:
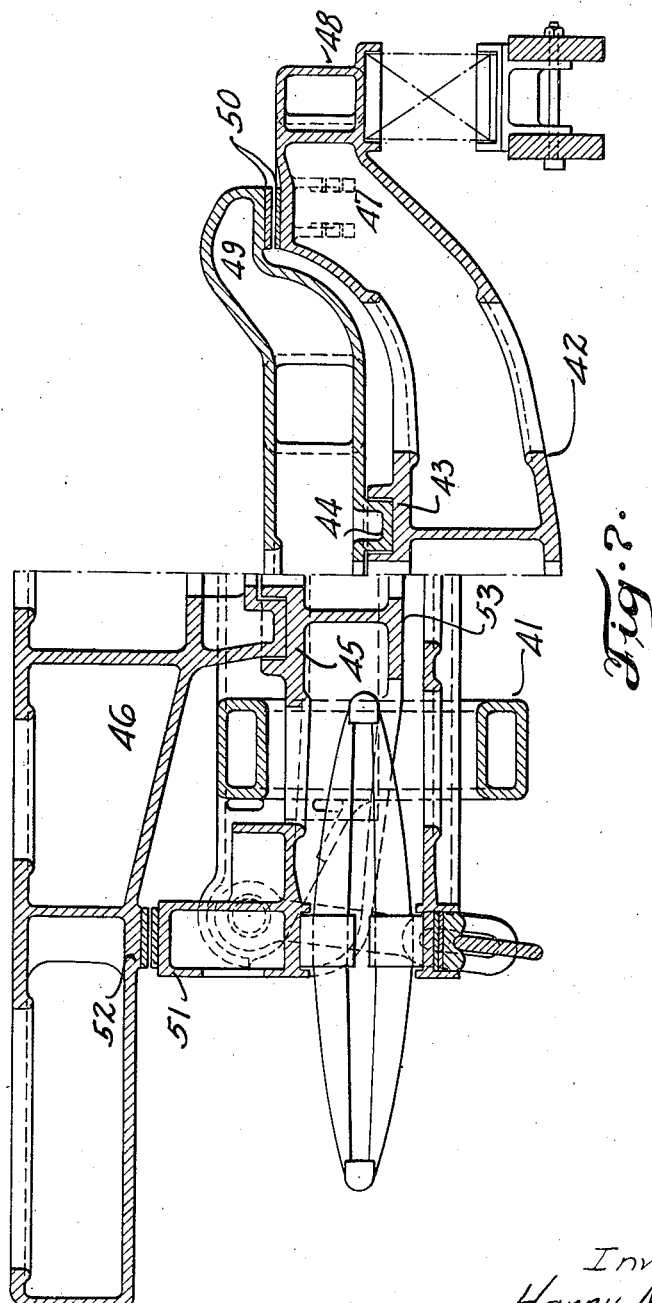
Figure 7 is a vertical transverse section taken on the line 9—9 of Figure 5 and drawn to an enlarged scale.

The complete truck structure embodies two units 1 and 2 and a saddle structure 3 with its end portions resting upon units 1 and 2 and with its central portion arranged to support the vehicle body 4. Each unit 1 and 2 is a four-wheel truck comprising the usual wheels 5, axles 6, journal boxes 7, equalizers 8, springs 9 and 10, and rigid frames 11 including pedestal jaws 12 and fixed transoms 13.

Preferably the trucks include electric motors 14, for driving the axles, and the brake gear as indicated at 15, and other usual truck equipment may be included. Preferably the two units are duplicates of each other.

Transoms 13 are of deep box section and include hollow center plate structure 16 communicating with the hollow interior of the transoms. Each transom also is provided with side bearing elements 17.

Saddle 3 comprises side members 20, spaced center transverse members 21, and end transverse members 22. Preferably, but not necessarily, each of these saddle parts is of box section and the entire saddle is an integral casting. The end portions of the saddle are relatively shallow and at its middle the sides 20 are of truss-like structure and include lower elements 20a and struts 20b. Each of end members 22 includes a downwardly facing center plate 22a and side bearing elements 22b opposing truck side bearing elements 17. Center plate 22a is hollow and the passage therethrough communicates with the hollow interior of end member 22. Brackets 20c on side members 20 at the ends of transverse members 21 pivotally support swing hangers 23, each pair of hangers having a cross bar 24 which mounts one end of a spring plank 25 carrying elliptic springs 26 which support the bolster 27, having an upwardly facing center plate 28 extending upwardly through the central opening between the saddle members 20 and 21, and adapted to receive the center plate 29 on the vehicle body indicated at 4. The bolster also has side bearings 30 arranged to cooperate with corresponding side bearings 31 on the body.

Spring plank 25, springs 26, and bolster 27 extend through the openings in the truss-like sides of saddle 3. This arrangement provides bolster 27 with lateral motion relative to saddle 3 whereby the transverse forces set up between the truck and the body are absorbed or dissipated and by locating this lateral motion bolster intermediate the center plates 16, the intensity of each force is diminished and such lateral forces as are transmitted to the truck are distributed substantially equally to both units.

Figures 5, 6 and 7 illustrate a modification of the above described structure which is adapted for use in a truck of eight or more wheels for tenders and other railway vehicles in which motors, and air conduits thereto, are not used and it is an object of this design to keep the distance from the center plates 43 and 44 to the track to a minimum and to lower the center of gravity of the vehicle. While the parts of the saddle 41 and the truck transoms 42 are shown as of box section for maximum strength, it will be understood that they may be made of I beam, Z bar, or channel shaped sections and may be a built-up structure as well as the integral cast structure indicated.

Each transom 42 has elevated end portions 47 connected to the wheel pieces 48 of the unit frame, and the outer portions 49 of the saddle end members are elevated to overlie the ends of the transoms, opposing side bearing elements 50 being provided on the transoms and saddle end member.

The saddle mounts the lateral motion bolster 53 intermediate the truck units in a manner similar to the mounting of the bolsters shown in Figures 1 to 4, and the outer ends of this bolster include elevated side bearing portions 51 arranged to cooperate with corresponding portions 52 of the vehicle body bolster.

Figures 8 and 9 illustrate another modification affecting particularly the mounting of the saddle 60 on the truck frame transoms 61. These latter are depressed similarly to the transoms shown in Figures 6 and 7 but instead of the saddle having a center plate support on the transom, the load is applied to the latter through side bearings 62 at the ends of the transverse end member 63 of the saddle. A centering dowel 64 on each member 63 is received in a suitable aperture provided therefor in the transom to provide pivotal connection of the saddle and truck units. With respect to the functioning of the saddle and truck units and particularly the mounting of the body supporting lateral motion bolster, this structure corresponds to that previously described.

It is within the spirit of the invention to provide cored openings in the walls of the air conduits in the saddle 3 of the structure shown in Figures 1 to 4 and wherever desired to facilitate molding and for removing core sand, such openings to be closed by plates welded to the saddle at the periphery of the openings.

It is well known that the lateral motion of railway bolsters may be effected by rollers and rockers as well as by swing hangers and such variation in bolster mounting may be made in the present structure. If desired, the spaced truck units may provide saddle supports in the form of lateral motion truck parts, thereby giving a supplementary lateral motion device for dissipating the transverse force between the vehicle body and wheels and axles. While it is believed this additional lateral motion arrangement will be superfluous and unnecessary, it will be understood that such arrangement and other modifications in the details of construction may be made without departing from the spirit of the invention as expressed in the appended claims.

I claim:

1. In a railway vehicle truck, spaced truck units each having wheels, axles, and a frame, a saddle pivotally supported on its longitudinal center line on said frames and having shallow portions overlying said frames and having relatively deep side portions between said units provided with lateral openings, swing hangers pivotally suspended from said saddle adjacent said openings, a spring plank supported by said hangers, bolster springs supported by said spring plank, and a bolster supported by said bolster springs and extending through said openings and arranged to support the vehicle body.

2. In a railway vehicle truck, spaced truck units each having wheels, axles, and a frame, a saddle comprising relatively shallow portions, extending over and supported by said frames at the longitudinal center line of the saddle, and a deeper section between said frames, said deeper section including sides having vertically spaced members, a bolster spring-supported by said saddle and extending between and beyond said members, said bolster having body engaging side bearings and a body supporting center plate.

3. In a railway vehicle truck, spaced truck units each having wheels, axles, and a frame with wheel pieces, a saddle supported by said frames at its longitudinal center and including sides spaced transversely of the truck but positioned between said wheel pieces, swing hangers pivotally suspended from said sides, and a bolster supported by said swing hangers and constructed and arranged to support a vehicle body intermediate said sides, there being body-engaging side bearings on said bolster outwardly of said sides and at substantially the same level as said sides.

4. In a railway vehicle truck, spaced truck units each having wheels, axles, and a frame, a saddle comprising relatively shallow portions, extending over and supported by said frames at its longitudinal center, and a deeper section between said frames, swing hangers pivotally suspended from the deeper section of said saddle and located outwardly of the sides thereof, a spring plank supported by said swing hangers and projecting outwardly of said saddle, bolster springs mounted on said spring plank, and a bolster supported by said bolster springs, said bolster including vehicle body supporting structure.

5. In a railway vehicle truck, spaced truck units each having wheels, axles, and a frame, a saddle comprising relatively shallow portions, extending over and supported by said frames at its longitudinal center, and a deeper section between said frames, said deeper section including vertically spaced members, swing hangers pivotally suspended from the upper of said members, a spring plank supported by said swing hangers and projecting between said members and outwardly of the same, bolster springs mounted on said spring plank, and a bolster supported by said bolster springs, said bolster including vehicle body supporting structure.

6. In a railway vehicle truck, spaced truck units each having wheels, axles, equalizers carried by said axles, and a frame, each of said frames including wheel pieces, which are spring supported on said equalizers, and a transom connected at its ends to said wheel pieces and having its middle portion depressed below the level of its ends, a saddle with the centers of its end portions resting respectively on said transoms and being located at substantially the same level as said wheel pieces and intermediate its end portions being provided with swing hangers, and a bolster supported on said swing hangers and including a vehicle body-supporting center plate at approximately the level of said wheel pieces.

7. In a railway vehicle truck, spaced truck units each having wheels, axles, and a frame, each of said frames including wheel pieces and a transom connected at its ends to said wheel pieces and having its middle portion depressed below the level of its ends and provided with an upwardly facing center plate, there being upwardly facing side bearings at the relatively elevated ends of said transoms, a saddle with its end portions pivotally mounted on said center plates and having relatively elevated lateral projections opposing said side bearings and intermediate its end portions being provided with swing hangers, and a bolster supported by said swing hangers and including a vehicle body-supporting center plate at approximately the level of said wheel pieces, there being body engaging side bearings on the ends of said lateral motion bolster.

8. In a railway vehicle truck, spaced truck units each having wheels, spaced axles, and a rigid frame including a transverse transom positioned between the axles of the unit, a saddle having longitudinal side members positioned wholly between opposite wheels of the unit and having transverse end members connecting said side members and pivotally supported intermediate their ends on the center portions of said transoms for swiveling thereon, a bolster member having lateral motion support on said saddle and constructed and arranged at its center to pivotally mount the vehicle body, there being opposing side bearing elements on said transoms and saddle end members and body engaging side bearing elements on said bolster member spaced outwardly of the truck from said saddle side members.

H. M. PFLAGER.